Patented July 9, 1935

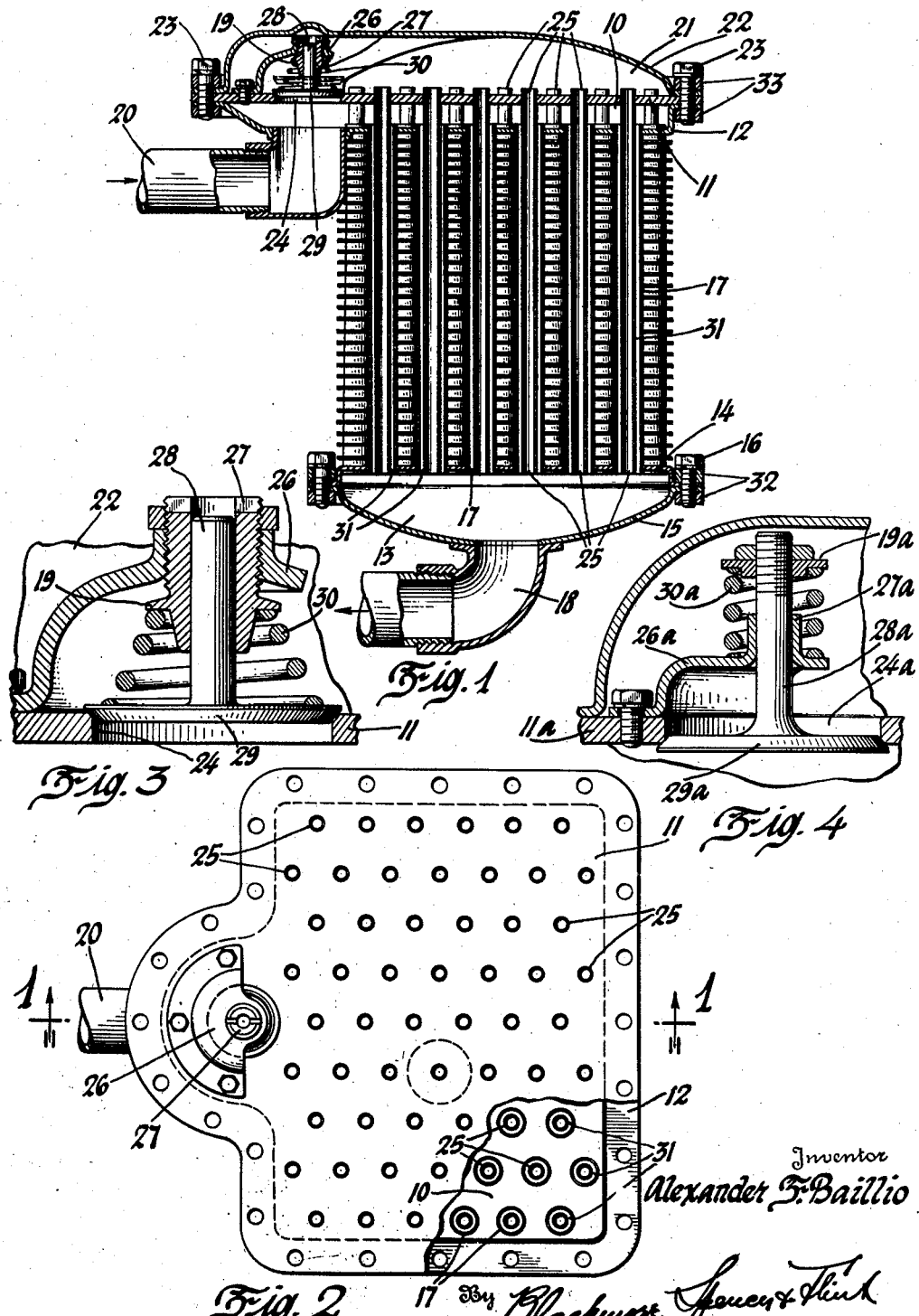

2,007,590

UNITED STATES PATENT OFFICE 2,007,590

OIL COOLER

Alexander F. Baillio, Detroit, Mich., assignor to General Motors Corporation, Detroit, Mich., a corporation of Delaware Application May 5, 1934, Serial No. 724,016

9 Claims. (Cl. 257—249)

In order to secure an effective interchange of heat between the temperature regulating fluid and the lubricant in temperature regulators for the lubricant of internal combustion engines, it is desirable that the lubricant passages in the heat exchange element of the regulator be thin—preferably no greater than one-sixteenth ($\frac{1}{16}$) of an inch in thickness. When the engine becomes chilled, as it may when it is not operating in cold weather, the lubricant becomes so viscous that the lubricant pump is not capable of advancing it through the thin lubricant passages in the heat exchange element of the regulator. To prevent, under these circumstances, in the lubricant passages of the heat exchange element of the regulator or in the passage which connects them with the pump, the development of sufficient pressure to rupture the walls of any of the passages and to insure, under these circumstances, that lubricant will be supplied to the bearings of the engine, it is common to provide, in conjunction with the regulator, a passage through which lubricant may be by-passed around the lubricant passages of the heat exchange element and a valve which normally closes the by-passage but is adapted to be opened by the pressure of the lubricant in the passage between the pump and the regulator when this pressure exceeds a predetermined value to permit the passage of lubricant through the by-passage. To expedite reduction of the viscosity of the lubricant in the lubricant passages of the heat exchange element of the regulator to such an extent that the pump will be capable of advancing lubricant therethrough, it has been proposed to arrange the by-passage, through which heated lubricant passes shortly after the engine is started, if it was initially chilled, in heat exchanging relation to the lubricant passages in the heat exchange element of the regulator. But, to the best of my knowledge, none of the arrangements proposed prior to the date of my invention have been such as to secure an efficient interchange of heat between the heated lubricant in the by-passage and the chilled lubricant in the lubricant passages of the heat exchange element of the regulator.

This invention relates to lubricant temperature regulators and resides in a lubricant temperature regulator in which the by-passage is so arranged with respect to the lubricant passages in the heat exchange element of the regulator as to secure an efficient interchange of heat between the lubricant in the by-passage and that in the lubricant passages in the heat exchange element and a rapid reduction of the viscosity of the lubricant in the passages in the heat exchange element so as to render the temperature regulator effective for the purpose for which it was designed as soon as possible after the engine is started.

For a better understanding of the nature and objects of the present invention, reference is made to the following specification wherein there are described the embodiments of my invention which are illustrated in the accompanying drawing.

In the accompanying drawing:

Figure 1 is a section, taken on the line I—I of Figure 2, through a lubricant temperature regulator in which the present invention is embodied.

Figure 2 is a top plan view of the regulator shown in Figure 1 with the outer plate of the auxiliary inlet header removed and with parts broken away and in section.

Figure 3 is an enlarged fragmentary section taken on the line I—I of Figure 2.

Figure 4 is an enlarged fragmentary section through a lubricant temperature regulator of modified form.

The lubricant temperature regulator which is shown in Figures 1 and 2 of the drawing includes an inlet header 10, which is made up of a flat plate 11 and a dished plate 12, and an outlet header 13, which is made up of dished plates 14 and 15 secured together by screws 16 and clamping rings 32. The headers are interconnected by a group of finned tubes 17 which are suitably secured to the plates 12 and 14, respectively. To the plate 12, there is connected a tubular element 20 through which lubricant is adapted to be conducted to the header 10 and to the plate 15, there is connected a tubular element 18 through which lubricant is adapted to be conducted from the header 13.

An auxiliary inlet header 21, which is made up of the previously mentioned flat plate 11 and a dished plate 22 which are secured together and to the dished plate 12 by screws 23 and clamping rings 33, communicates with the inlet header 10 through a port 24 in the plate 11 coaxial with the opening through which the tubular element 20 communicates with the inlet header 10, and with the outlet header 13 through tubes 25 which are carried by the plate 11 and are, in number, equal to the tubes 17. The portion of each of the tubes 25 which extends between the plates 12 and 14 is located within, coaxial with and circumferentially spaced from the walls of one of the tubes 17.

To the plate 11 adjacent the port 24, there is secured a bracket 26 through which there extends coaxially with the port 24 a vertically adjustable guide sleeve 27 on which there is formed a spring seat 19. The stem 28 of a valve 29, which is adapted to be seated on the edges of and close the port 24 in the plate 11 extends into the guide sleeve 27. A coil spring 30, which is seated at its opposite ends on the seat 19 and the valve 29 tends to seat the valve on the edges of and close the port 24.

The lubricant temperature regulator hereinbefore described is adapted to be installed on an internal combustion engine so that the engine lubricant pump advances lubricant therethrough from the tubular element 20 to the tubular element 18 and that a current of air, resulting from a fan or the movement of the vehicle on which the engine is installed, flows between and around the tubes 17.

Preferably, the internal diameter of the tubes 25 is made sufficiently large that, under the most unfavorable conditions, the lubricant pump is capable of advancing lubricant through the tubes 25 without creating an undesirably high pressure in them or in the passage which connects them with the pump and the difference between the external diameter of the tubes 25 and the internal diameter of the tubes 17 is made sufficiently small to secure an effective interchange of heat between the lubricant in the passages 31 between the tubes and the current of air which flows between and around the tubes 17.

When the lubricant temperature regulator is installed as described above and the engine is operating under normal conditions, the spring 30 holds the valve 29 on its seat and the lubricant flows from the tubular element 20 to the tubular element 18 through the inlet header 10, the annular passages 31 between the tubes 17 and 25 and the outlet header 13, being cooled during its passage from the inlet header 10 to the outlet header 13 by the current of air which flows between the tubes 17. However, if the engine is started after having been chilled to such an extent that the lubricant pump is not capable of advancing lubricant through the thin annular passages 31 without creating an undesirably high pressure in them and the passage which connects them with the pump, the pressure of the lubricant will unseat the valve 29 against the resistance of the spring 30 and lubricant will flow from the tubular element 20 to the tubular element 18 through the port 24, the auxiliary inlet header 21, the tubes 25 and the outlet header 13. Since the heat generated as a result of the operation of the engine quickly heats the lubricant in the engine, the lubricant pump will, shortly after the engine is started, advance heated lubricant through the tubes 25. Heat from the lubricant within the tubes 25 will be transmitted through the walls of the tubes to the lubricant in the annular passages 31 and will quickly and efficiently reduce the viscosity of the lubricant within the passages 31 to such an extent that the lubricant pump will be capable of advancing lubricant therethrough without creating an undesirably high pressure in the passages 31 and the passage which connects them with the pump. When this condition is attained, the spring 30 seats the valve 29 against the pressure of the lubricant and lubricant flows from the tubular element 20 to the tubular element 18 in the manner first described.

It will be observed that the construction hereinbefore described and illustrated in the drawing facilitates dis-assembly of the regulator in the event it becomes desirable to clean or repair it and re-assembly of the regulator after the cleaning or repairing operation has been completed since the plates 15 and 22 and the plate 11 (together with the tubes 25 which are carried thereby) may be separated from the body of the regulator upon removal of the screws 16 and 23 and clamping rings 32 and 33 and may be re-assembled therewith by merely replacing them and the screws and clamping rings.

The temperature regulator hereinbefore described and illustrated in Figures 1, 2 and 3 of the drawing may be modified so as to adapt it to be used so that the lubricant enters it through the tubular element 18 and leaves it through the tubular element 20 by substituting for the upwardly opening valve 29 a downwardly opening valve. The temperature regulator shown in Figures 1, 2 and 3 equipped with a downwardly opening valve is fragmentarily shown in Figure 4 in which the reference character 26a indicates a bracket which is secured to the plate 11a adjacent the port 24a and on which coaxially with the port 24a there is formed a guide sleeve 27a. The stem 28a of the valve 29a which is adapted to be seated on and close the port 24a in the plate 11a extends through the guide sleeve 27a and carries on its upper end a vertically adjustable spring seat 19a. A coil spring 30a, which is seated at its opposite ends on the spring seat 19a and the bracket 26a, tends to seat the valve on the edges of and close the port 24a.

It will, of course, be understood that, although I have shown and described my invention in connection with an air-cooled temperature regulator for the lubricant of internal combustion engines, it is applicable to temperature regulators for all fluids similar to the lubricant of internal combustion engines and to temperature regulators in which a liquid is employed as the temperature regulating fluid as well as to temperature regulators in which a gas is employed as the temperature regulating fluid.

I claim:

1. In a heat exchanger for use with the lubricant of internal combustion engines and similar fluids, two headers, a tubular element which extends from one of the headers to the other, an auxiliary header, a tubular element which connects the auxiliary header and one of the two first-mentioned headers and extends through the first-mentioned tubular element and defines in conjunction therewith an annular passage which connects the two first-mentioned headers and whose transverse dimension is less than that of the tubular element which connects the auxiliary header and one of the two first-mentioned headers, a passage which connects the auxiliary header and the other of the two first-mentioned headers, and a valve in the connecting passage which is adapted to permit the fluid to flow through the auxiliary header and the second-mentioned tubular element when the resistance to the flow of the fluid through the annular passage exceeds a predetermined value.

2. In a heat exchanger for use with the lubricant of internal combustion engines and similar fluids, a tubular element, a tubular element which constitutes a fluid passage and extends through the first-mentioned tubular element and defines in conjunction therewith an annular passage whose transverse dimension is less than that of the first-mentioned passage, a passage which connects the mentioned passages, and a valve in the third-mentioned passage which is adapted to permit the fluid to flow through the first-mentioned passage when the resistance to the flow of the fluid through the annular passage exceeds a predetermined value.

3. In a heat exchanger for use with the lubricant of internal combustion engines and similar fluids, a tubular element, a tubular element which constitutes a fluid passage and extends through the first-mentioned tubular element and defines in conjunction therewith an annular passage, a passage which connects the mentioned passages, and a valve in the connecting passage which is adapted to permit the fluid to flow through one of the two first-mentioned passages when the resistance to the flow of the fluid through the other of the two first-mentioned passages exceeds a predetermined value.

4. In a heat exchanger for use with the lubricant of internal combustion engines and similar fluids, a passage which has a relatively small transverse dimension through which the fluid is adapted to flow, a passage whose transverse dimensions are relatively large through which the fluid is adapted to flow, the passages being arranged in parallel and having a common wall, a passage which connects the mentioned passages, and a valve in the connecting passage which is adapted to permit the fluid to flow through the second-mentioned passage when the resistance to the flow of the fluid through the first-mentioned passage exceeds a predetermined value.

5. In a heat exchanger for use with the lubricant of internal combustion engines and similar fluids, a header, a plurality of headers which communicate independently of each other with the first-mentioned header, a passage connecting the plurality of headers, and a valve in the passage.

6. In a heat exchanger for use with the lubricant of internal combustion engines and similar fluids, a header, and a plurality of headers communicating with the first-mentioned header.

7. In a heat exchanger for use with the lubricant of internal combustion engines and similar fluids, a header, two headers, a tubular element which connects one of the two second-mentioned headers with the first-mentioned header, and a tubular element which connects the other of the two second-mentioned headers with the first-mentioned header and extends through the first-mentioned tubular element.

8. In a heat exchanger for use with the lubricant of internal combustion engines and similar fluids, a header, two headers, a tubular element which connects one of the two second-mentioned headers with the first mentioned header, a tubular element which connects the other of the two second-mentioned headers with the first-mentioned header and extends through the first-mentioned tubular element, a passage which connects the two second-mentioned headers, and a valve in the passage.

9. In a heat exchanger for use with the lubricant of internal combustion engines and similar fluids, a header, a plurality of headers which communicate independently of each other with the first-mentioned header, and a passage connecting the plurality of headers independently of the first-mentioned header.

ALEXANDER F. BAILLIO.